US008993668B2

(12) United States Patent
Cabrera

(10) Patent No.: US 8,993,668 B2
(45) Date of Patent: *Mar. 31, 2015

(54) POLYVINYL ESTER DISPERSIONS, PROCESS FOR PREPARATION THEREOF AND USE THEREOF

(75) Inventor: Ivan Cabrera, Dreieich (DE)

(73) Assignee: Celanese Emulsions GmbH, Kronberg (DE)

(*) Notice: Subject to any disclaimer, the term of this patent is extended or adjusted under 35 U.S.C. 154(b) by 397 days.

This patent is subject to a terminal disclaimer.

(21) Appl. No.: 12/173,329

(22) Filed: Jul. 15, 2008

(65) Prior Publication Data

US 2009/0043035 A1 Feb. 12, 2009

(30) Foreign Application Priority Data

Jul. 19, 2007 (DE) .......................... 10 2007 033 595

(51) Int. Cl.
| | |
|---|---|
| C08F 2/16 | (2006.01) |
| C08L 11/02 | (2006.01) |
| C08F 2/22 | (2006.01) |
| C08F 218/08 | (2006.01) |
| C08F 220/18 | (2006.01) |
| C08F 263/00 | (2006.01) |
| C08F 263/02 | (2006.01) |
| C08F 263/04 | (2006.01) |
| C08L 51/00 | (2006.01) |
| C09D 131/02 | (2006.01) |
| C09D 143/04 | (2006.01) |
| C09D 151/00 | (2006.01) |
| C08F 230/08 | (2006.01) |

(52) U.S. Cl.
CPC .................. *C08F 2/22* (2013.01); *C08F 218/08* (2013.01); *C08F 220/18* (2013.01); *C08F 263/00* (2013.01); *C08F 263/02* (2013.01); *C08F 263/04* (2013.01); *C08L 51/003* (2013.01); *C09D 131/02* (2013.01); *C09D 143/04* (2013.01); *C09D 151/003* (2013.01); *C08F 230/08* (2013.01)
USPC ........... 524/460; 523/201; 524/457; 524/458; 524/459; 524/503; 524/517; 524/522; 524/523; 524/524

(58) Field of Classification Search
CPC ................ C08F 2/20; C08F 2/22; C08F 2/24; C08F 218/08; C08F 220/06; C08F 220/18; C08F 230/00; C08F 230/02; C08F 230/08; C08F 263/00; C08F 263/02; C08F 263/04; C09D 131/02; C09D 131/04
USPC .......... 523/201; 524/458, 459, 460, 503, 517, 524/522, 523, 524, 457
See application file for complete search history.

(56) References Cited

U.S. PATENT DOCUMENTS

| | | | |
|---|---|---|---|
| 2,566,251 | A | 6/1946 | Richards et al. |
| 2,628,948 | A | 2/1953 | Kunze et al. |
| 3,301,809 | A | 1/1967 | Goldberg et al. |
| 3,524,828 | A | 8/1970 | Keithley |
| 3,563,851 | A | 2/1971 | Armour et al. |
| 3,644,262 | A | 2/1972 | Stehle et al. |
| 3,647,735 | A | 3/1972 | Brodnyan |
| 3,931,088 | A | 1/1976 | Sakurada et al. |
| 3,932,335 | A | 1/1976 | Gorton |
| 4,100,137 | A | 7/1978 | Lemieux et al. |
| 4,118,357 | A | 10/1978 | Brabetz et al. |
| 4,269,749 | A | 5/1981 | Marriott et al. |
| 4,542,181 | A | 9/1985 | Schuppiser et al. |
| 4,616,057 | A | 10/1986 | Lindemann et al. |
| 4,634,727 | A | 1/1987 | Kamikaseda et al. |
| 4,683,165 | A | 7/1987 | Lindemann et al. |
| 4,999,218 | A | 3/1991 | Rehmer et al. |
| 5,047,295 | A | 9/1991 | Dotzauer et al. |
| 5,073,578 | A | 12/1991 | Boodaghains et al. |
| 5,162,415 | A | 11/1992 | Rehmer et al. |
| 5,545,684 | A | 8/1996 | Jakob et al. |
| 5,614,049 | A | 3/1997 | Kohlhammer et al. |
| 5,744,418 | A | 4/1998 | Jakob |
| 5,747,578 | A * | 5/1998 | Schmitz et al. ............... 524/502 |
| 5,750,617 | A | 5/1998 | Eck et al. |
| 5,846,601 | A | 12/1998 | Ritter et al. |
| 6,054,519 | A | 4/2000 | Jakob et al. |

(Continued)

FOREIGN PATENT DOCUMENTS

| | | |
|---|---|---|
| DE | 2261402 | 7/1974 |
| DE | 2620738 A1 | 12/1977 |

(Continued)

OTHER PUBLICATIONS

Publication, "Emulsion Polymerization and Emulsion Polymers", Peter A. Lovell and Mohamed S. El-Aasser, Wiley, New York 1997, pp. 26-31.
European Search Report EP 08 01 1291, dated Jan. 23, 2009.
European Search Report EP 08 01 1292, dated Dec. 17, 2008.
Dimonie et al., "Control of Particle Morphology," *Emulsion Polymerization and Emulsion Polymer*, Edited by Peter A. Lovell and Mohamed S. El-Aasser, pp. 294-326 (Apr. 1997).
Robert G. Gilbert, "Emulsion Polymerization—A Mechanistic Approach,", *Academic Press*, pp. 15-18 (1995).

(Continued)

*Primary Examiner* — David W Wu
*Assistant Examiner* — Marie Reddick
(74) *Attorney, Agent, or Firm* — Dority & Manning, P.A.

(57) ABSTRACT

What are described are polyvinyl ester dispersions which are prepared in a multistage process and have a low content of polymerized acids or acid anhydrides. They can be obtained by a multistage process in which a polyvinyl ester dispersion is obtained in a first stage, monomers in dissolved or pure form are added to the reaction mixture in a second stage and then the polymerization is started again. The polymer dispersions obtained in this way are notable for a low coagulum content and for increased tensile strengths of the films formed therefrom.

17 Claims, No Drawings

(56) References Cited

U.S. PATENT DOCUMENTS

| | | | |
|---|---|---|---|
| 6,093,766 A | 7/2000 | Jakob et al. | |
| 6,122,860 A | 9/2000 | Von Tapavicza et al. | |
| 6,265,028 B1 | 7/2001 | Zhao | |
| 6,476,097 B1 | 11/2002 | Zhao et al. | |
| 6,476,124 B1 | 11/2002 | Mougin | |
| 6,569,279 B1 | 5/2003 | Park et al. | |
| 6,667,352 B1 * | 12/2003 | Kusters et al. | 523/201 |
| 6,706,805 B2 * | 3/2004 | Weitzel | 524/563 |
| 6,710,113 B2 * | 3/2004 | Weitzel | 524/458 |
| 6,790,272 B1 | 9/2004 | Zhao et al. | |
| 7,015,362 B2 | 3/2006 | Lappe et al. | |
| 7,078,455 B2 | 7/2006 | Heldmann et al. | |
| 7,585,915 B2 | 9/2009 | Jakob et al. | |
| 8,030,391 B2 * | 10/2011 | Petri et al. | 524/457 |
| 2004/0048961 A1 | 3/2004 | Klein et al. | |
| 2004/0068042 A1 | 4/2004 | Bachon et al. | |
| 2004/0077782 A1 | 4/2004 | Heldmann et al. | |
| 2005/0032970 A1 | 2/2005 | Jakob et al. | |
| 2007/0060702 A1 | 3/2007 | Gao et al. | |
| 2007/0112117 A1 | 5/2007 | Weitzel | |
| 2008/0206582 A1 | 8/2008 | Scholtyssek et al. | |
| 2009/0043035 A1 | 2/2009 | Cabrera | |
| 2009/0281218 A1 | 11/2009 | Hardt et al. | |

FOREIGN PATENT DOCUMENTS

| | | |
|---|---|---|
| DE | 3827975 A1 | 3/1990 |
| DE | 3901073 A1 | 7/1990 |
| DE | 3942628 A1 | 6/1991 |
| DE | 4003422 A | 8/1991 |
| DE | 4118634 A1 | 12/1992 |
| DE | 4431343 A1 | 4/1996 |
| DE | 19548314 A1 | 6/1997 |
| DE | 19649419 A1 | 6/1998 |
| DE | 19701325 A1 | 7/1998 |
| DE | 19739939 A1 | 3/1999 |
| DE | 19811314 A1 | 9/1999 |
| DE | 19830555 A1 | 1/2000 |
| DE | 19853461 A1 | 5/2000 |
| DE | 100 48 888 A1 | 4/2002 |
| DE | 101 26 560 C1 | 9/2002 |
| DE | 10112431 A1 | 10/2002 |
| DE | 101 22 786 A1 | 11/2002 |
| DE | 102 36 395 A1 | 2/2004 |
| DE | 60004914 T2 | 7/2004 |
| DE | 10329594 | 1/2005 |
| DE | 103356763 A1 | 3/2005 |
| DE | 10 2005 032 194 A1 | 1/2007 |
| DE | 10 2005 057 645 A1 | 6/2007 |
| DE | 10 2006 013 898 A1 | 9/2007 |
| EP | 0050548 A1 | 4/1982 |
| EP | 0050548 A1 | 4/1982 |
| EP | 0191460 A2 | 8/1986 |
| EP | 0191460 A3 | 8/1986 |
| EP | 0206059 A2 | 12/1986 |
| EP | 0206059 A3 | 12/1986 |
| EP | 0256391 A2 | 2/1988 |
| EP | 0256391 A3 | 2/1988 |
| EP | 0347760 B1 | 12/1989 |
| EP | 0381122 A2 | 8/1990 |
| EP | 0413136 A2 | 2/1991 |
| EP | 0413136 A3 | 2/1991 |
| EP | 0417568 A2 | 3/1991 |
| EP | 0417568 A3 | 3/1991 |
| EP | 0444827 A1 | 9/1991 |
| EP | 0554747 A2 | 8/1993 |
| EP | 0554747 A3 | 8/1993 |
| EP | 0581264 A1 | 2/1994 |
| EP | 0609756 A2 | 8/1994 |
| EP | 0609756 A3 | 8/1994 |
| EP | 0686682 A1 | 12/1995 |
| EP | 0705896 A1 | 4/1996 |
| EP | 0710675 A2 | 5/1996 |
| EP | 0778290 A2 | 6/1997 |
| EP | 0778290 A3 | 6/1997 |
| EP | 0829509 A1 | 3/1998 |
| EP | 0834530 A1 | 4/1998 |
| EP | 0970993 A1 | 1/2000 |
| EP | 1018535 A1 | 7/2000 |
| EP | 1134244 A2 | 9/2001 |
| EP | 1134244 A3 | 9/2001 |
| EP | 1 174 447 A1 | 1/2002 |
| EP | 1170311 A1 | 1/2002 |
| EP | 1237519 A1 | 9/2002 |
| EP | 1505085 A1 | 2/2005 |
| GB | 690299 | 4/1953 |
| GB | 1 212 165 | 11/1970 |
| GB | 1297709 | 11/1972 |
| JP | 55157641 A | 12/1980 |
| JP | 56125446 A | 10/1981 |
| JP | 63265983 | 11/1988 |
| JP | 1229085 A | 9/1989 |
| JP | 08291469 A | 11/1996 |
| JP | 10121017 A | 5/1998 |
| JP | 2001 335763 A | 12/2001 |
| WO | WO 9636648 A1 | 11/1996 |
| WO | WO 9803604 A1 | 1/1998 |
| WO | WO 9812237 A1 | 3/1998 |
| WO | WO 0002967 A1 | 1/2000 |
| WO | WO 02 074856 A2 | 9/2002 |
| WO | WO 02 074856 A3 | 9/2002 |
| WO | WO 2006/111290 A | 10/2006 |
| WO | WO 2007/006413 A1 | 1/2007 |

OTHER PUBLICATIONS

Jonsson et al., "Polymerization Conditions and the Development of a Core-Shell Morphology in PMMA/PS Latex Particles. 1. Influence of Initiator Properties and Mode of Monomer Addition," *American Chemical Society*, Macromolecules, vol. 27, No. 7, pp. 1932-1937 (1994).

Yu et al., "Study of Particle Morphology in Polymer Emulsions and Their Minimum Film Formation Temperatures," *Journal of Applied Polymer Science*, vol. 41, 1990, pp. 1965-1972 (1990).

Search Report for PCT/EP 2006/006173 dated Oct. 20, 2006, 4 pages.

Translation of International Preliminary Report on Patentability dated Jun. 12, 2008, 6 pages.

Search Report for PCT/EP2006/011206 dated Mar. 16, 2007, 4 pages.

International Preliminary Report on Patentability for PCT/EP2006/011206, 7 pages.

Search Report for PCT/EP2008/001090 dated Jun. 23, 2008, 6 pages.

International Preliminary Report on Patentability (Written Opinion) for PCT/EP2008/001090 dated Oct. 6, 2009, 7 pages.

Search Report for PCT/EP2008/004191 dated Oct. 1, 2008, 4 pages.

* cited by examiner

POLYVINYL ESTER DISPERSIONS, PROCESS FOR PREPARATION THEREOF AND USE THEREOF

The present invention relates to polyvinyl ester dispersions prepared in a multistage process, to a multistage process for preparing polyvinyl ester dispersions, and to the use of these dispersions as binders, especially for architectural preservatives such as emulsion paints. The coatings produced from these emulsion paints have a weathering stability comparable to the emulsion paints comprising binders based on polyacrylate.

Polymer dispersions derived from vinyl esters and monomers copolymerizable therewith and their use as binders for architectural preservatives are known and have already been described many times. Such polymer dispersions are typically prepared by emulsion polymerization; the polymerization can be effected in one or more stages. In the polymerization processes which have become known to date, monomer mixtures are converted by free-radical polymerization by addition of initiators in the presence of protective colloids and/or emulsifiers. The monomers are added before or during the free-radical polymerization.

Some combinations of monomers are difficult to polymerize with one another. This is manifested in highly variable copolymerization parameters (cf. P. A. Lowell, Emulsion Polymerization and Emulsion Polymers, Wiley, New York 1997, pp. 26-31). In such cases, it may be the case that no copolymers form, but rather two separate homopolymers independently. The prior art already discloses several processes for inducing monomers which are actually difficult to react with one another to form copolymers.

For instance, EP-A-710,675 describes a process for polymerizing monomers of which at least one has a poor water solubility, or for polymerization in which a polymer with a poor water solubility forms. The process includes the use of a macromer with a hydrophobic cavity, for example of a cyclodextrin, during the polymerization. In one variant of the process, the copolymerization proceeds in an aqueous system in the presence of this macromer, in which case the sparingly water-soluble monomer is first complexed in the macromer and then the polymerization proceeds, preferably in the presence of a further water-soluble monomer.

EP-A-381,122 describes a two-stage polymerization for preparing a vinyl acetate copolymer emulsion. The copolymer contains comonomers incompatible with vinyl acetate. The process comprises, in a first stage, the emulsion polymerization of vinyl acetate and optionally further comonomers until the virtually complete conversion of the vinyl acetate, and, in a second stage, the addition and polymerization of a second monomer incompatible with vinyl acetate. In the process, no further stabilizer is added during the second stage and the copolymerization of the second stage begins immediately after addition of the incompatible monomer, without a partition equilibrium being able to establish itself between the incompatible monomer and the reaction product of the first stage. The resulting multistage polymers are notable in that their morphology corresponds essentially to the morphology (particle size and polydispersity) of the particles of the first stage and in that the glass transition temperatures of the polymer of the first stage are maintained, without a further glass transition temperature of the polymer of the second stage being detectable.

U.S. Pat. No. 4,616,057 describes a polymer emulsion comprising an interpenetrating network. The document describes the multistage emulsion polymerization of vinyl acetate and a crosslinking monomer copolymerizable therewith, such as N-methylolacrylamide, with monomers which are barely copolymerizable therewith, if at all, such as methyl methacrylate or styrene. In the first stage, the process comprises the preparation of a first emulsion polymer. To this product stage is added a second emulsion which comprises a monomer different from the monomer of the first stage and the establishment of an equilibrium is awaited. Thereafter, the second stage of the emulsion polymerization is started, and an interpenetrating network with physically distinguishable polymers forms. In the dispersion, it is possible to measure different glass transition temperatures, and films formed from the dispersion are notable, compared to films formed from mixtures of dispersions of the individual polymers, for increased tensile strengths, higher moduli of elasticity and improved impact resistances. In the reworking of the process known from U.S. Pat. No. 4,616,057, it has been found that the dispersions described have comparatively high proportions of coagulum. The prior art process leads to an increased level of complexity in production, since several filter changes and relatively long production times are required and since the reactor is contaminated. Moreover, a high coagulum content disrupts the use of the dispersion. For instance, binders for emulsion paints should be very substantially free of coagulum. Moreover, the by the prior art process comprise comparatively high proportions of emulsifiers owing to their mode of preparation. Especially by virtue of the addition of monomer emulsion in the second stage, a high emulsifier content occurs in the resulting dispersion, which adversely affects the water stability of the films and paints produced from these dispersions.

EP-A-581,264 describes mixtures of copolymers essentially consisting of vinyl acetate-ethylene copolymers and selected styrene or acrylate copolymers with a comparatively high proportion of polymerized acrylic acid or of maleic anhydride. The dispersions described include those derived from vinyl acetate and ethylene, which are admixed with styrene or selected acrylates and with comparatively high amounts of acrylic acid or maleic anhydride and are then subjected to a polymerization. As a result of the high acid (anhydride) contents, the resulting blends or dispersions tend to form high viscosities.

DE 101 26 560 C1 describes the use of mixed polymers of particular copolymers, also including vinyl ester copolymers, in building materials. The copolymerization proceeds in two stages in the presence of comparatively large amounts of protective colloid. The products are suitable for producing readily redispersible powders. They are used as a further binder in building materials which comprise further binders formed from hydraulically setting materials.

It is an object of the present invention to provide polymer dispersions which comprise at least one polyvinyl ester phase and are prepared in a multistage process and whose films, compared to films formed from the corresponding monomer mixtures of dispersions prepared by one-stage copolymerization, are notable for improved tensile strength, which are substantially coagulum-free and which do not require any introduction of emulsifiers in the second phase of the polymerization.

It is a further object of the present invention to provide an improved process for multistage preparation of polyvinyl ester dispersions, especially in the case of use of monomers which are difficult to copolymerize with one another, such as vinyl esters and (meth)acrylates and/or of vinylaromatics.

It has now been found that, surprisingly, when particular process parameters are maintained in the multistage preparation of polyvinyl ester dispersions, it is possible to obtain products which, compared to polyvinyl ester dispersions of the same monomer composition prepared in a one-stage process, have the abovementioned advantageous properties.

The invention provides polyvinyl ester dispersions obtainable by multistage free-radical emulsion polymerization of at least one vinyl ester of a saturated carboxylic acid and of at least one different free-radically polymerizing monomer in the presence of protective colloids and/or emulsifiers. In the inventive polyvinyl ester dispersions, firstly, the tensile strength of the films obtained from the polyvinyl ester dispersion prepared in a multistage process is at least 10%, preferably at least 20%, greater than the tensile strength of films which have been produced from polyvinyl ester dispersions of the same monomer composition which have been prepared in a one-stage process, and, secondly, the inventive polyvinyl ester dispersions have a screen residue, measured with a 40 μm screen, of less than 0.05% by weight, preferably less than 0.02% by weight, more preferably less than 0.008% by weight, based on the dispersion.

In addition, in the inventive polyvinyl ester dispersions, the content of polymerized acids and/or acid anhydrides does not exceed 6% by weight, especially 3% by weight, based on the total amount of monomers.

The screen residue is determined in analogy to DIN 53786. To this end, the dispersion is passed through a screen with mesh size 40 μm. The screen residue is determined by the following formula:

$$\text{screen residue (\%)} = [(G1-G2) \times 100]/\text{starting weight}$$

In this formula,
G1 is the weight of the dried screen with coagulum in g
G2 is the weight of the dried screen without coagulum in g, and
Starting weight is the amount of dispersion in g which has been passed through the screen.

Preference is given to the above-defined polyvinyl ester dispersions obtained in a multistage process for which the contact angle between water and the films obtained from the multistage polyvinyl ester dispersion is at least 10%, preferably at least 20%, greater than the contact angle between water and films which have been obtained from polyvinyl ester dispersions of the same monomer composition prepared in a one-stage process.

Preference is likewise given to the above-defined polyvinyl ester dispersions which have been obtained in a multistage process and have a content of emulsifiers of up to 5.0% by weight, more preferably of up to 3.65% by weight, especially of less than 1% by weight, based on the total mass of monomers used. Very particular preference is given to the above-defined polyvinyl ester dispersions which have been obtained in a multistage process and contain no or up to 3.65% by weight, especially up to 1% by weight, of emulsifiers and which are additionally stabilized by protective colloids.

The present invention further provides a multistage process for preparing polyvinyl ester dispersions and the polyvinyl ester dispersions obtainable thereby.

The process according to the invention is characterized by the following steps:
i) polymerizing at least one vinyl ester of a saturated carboxylic acid and optionally further monomers copolymerizable therewith in the presence of at least one emulsifier and/or at least one protective colloid up to a conversion of at least 90% of the monomers used,
ii) adding at least one free-radically polymerizable monomer other than the vinyl ester used in step i) in pure form or in the form of a solution to the polymerization mixture obtained in step i), and
iii) adding at least one initiator of free-radical polymerization after the addition of the monomer(s) in step ii) has ended, such that the monomer(s) added in step ii) are polymerized in the presence of the dispersion obtained in step i), with the proviso that the content of monomers with acid groups and/or with acid anhydride groups does not exceed 6% by weight, based on the total amount of monomers.

In the context of this description, the expression "in pure form" is understood to mean that the monomers are added to the polymerization mixture without further addition. A special purification of the monomers is not required.

It is assumed that, by virtue of the addition of the monomers in steps ii) under conditions under which, to a predominant degree, no further polymerization reactions proceed in the polymerization mixture, and the awaiting of the restart of the polymerization in step iii), a partition equilibrium is established between the monomer added in stage ii) and the reaction product of stage i). The monomers hydrophobic with respect to water which are added in step ii) probably diffuse fully into the polymer particles prepared in step i) and are polymerized into these particles when the polymerization restarts. The process according to the invention is therefore also referred to as inclusion polymerization.

The restart of the polymerization in step iii) can be effected immediately after the addition of the monomer(s) in step ii), or the polymerization mixture is left to stand for a further period, for example from 10 to 60 minutes, before the initiator is added, in order to start step iii).

In a preferred embodiment, in step i) and/or in step ii), at least one monomer containing ethylenically unsaturated silane groups and/or at least one ethylenically unsaturated epoxide compound is used.

In a further preferred embodiment, the content of protective colloid, based on the total monomer content, is from 0 to less than 1% by weight.

The particles prepared by the inventive inclusion polymerization are larger than the particles of the same monomer composition prepared by conventional emulsion polymerization. Typically, the mean particle sizes of the dispersions prepared by inclusion polymerization are at least 10% greater than the mean particle sizes of dispersions of the same monomer composition prepared by conventional one-stage emulsion polymerization.

Moreover, the glass transition temperatures of the dispersions prepared by inventive inclusion polymerization differ from the glass transition temperatures of dispersions comprising particles of the same monomer composition which have been prepared by conventional one-stage emulsion polymerization.

The glass transition temperatures of the inventive multistage polymers can vary within wide ranges. For typical inventive copolymers, they vary within the range from −50° C. to +110° C., preferably from −30° C. to +40° C., determined by differential scanning calorimetry at a heating rate of 10 K/minute. The glass transition temperatures of the multistage polymers can be adjusted by selection of the monomer combinations in a manner known per se by the person skilled in the art.

The monomers used to prepare the inventive polyvinyl ester dispersions are known per se.

The vinyl esters of a saturated carboxylic acid used in step i) in the preparation of the inventive dispersions include vinyl esters of straight-chain and/or branched aliphatic carboxylic acids having from one to eighteen carbon atoms. In addition, it is also possible to use vinyl esters of aromatic carboxylic acids.

The preferred monomers of this type include vinyl formate, vinyl acetate, vinyl propionate, vinyl butyrate, vinyl isobutyrate, vinyl pivalate, vinyl 2-ethylhexanoate, vinyl esters of saturated branched monocarboxylic acids having from 9 to 11 carbon atoms in the acid radical, vinyl esters of relatively long-chain saturated or unsaturated fatty acids, for example vinyl laurate or vinyl stearate, and also vinyl esters of benzoic acid and substituted derivatives of benzoic acid such as vinyl p-tert-butylbenzoate. Among these, vinyl acetate is particularly preferred.

The vinyl esters mentioned can be used individually in the preparation of the inventive dispersions in step i), or may preferably be present in a mixture with other monomers which may or may not be vinyl esters. The proportion of the vinyl esters in step i), based on the total amount of monomers used in this step, is generally at least 40% by weight, preferably at least 70% by weight.

In the preparation of the inventive dispersions, further monomers may optionally be used in step i). These are ethylenically unsaturated comonomers which can be copolymerized with vinyl esters of saturated carboxylic acids. They may be comonomers which can be copolymerized in a simple manner with the vinyl esters; however, it is also possible to use comonomers which can be copolymerized together with the vinyl esters only in small amounts. In these cases, the person skilled in the art will select the amounts of the individual copolymers such that the initially charged comonomers are consumed in the copolymerization.

Optional comonomers used with preference in step i) are ethylenically unsaturated aliphatic or cycloaliphatic hydrocarbons, especially α-olefins having 2-12 carbon atoms, such as ethylene, propylene and/or butylene; and halogenated unsaturated aliphatic hydrocarbons, for example vinyl chloride, vinyl fluoride, vinylidene chloride, vinylidene fluoride. The proportion of these comonomers in the total amount of monomers used in step i) is up to 50% by weight, preferably up to 25% by weight.

Further optional comonomers used in step i) are α,β-unsaturated monocarboxylic acids, for example acrylic acid, methacrylic acid and/or itaconic acid. It is also possible to use α,β-unsaturated dicarboxylic acids, for example maleic acid, fumaric acid, itaconic acid and/or citraconic acid, or anhydrides thereof. The proportion of these comonomers in the total amount of monomers used in step i) is up to 5% by weight, preferably up to 3% by weight.

Further optional comonomers used with preference in step i) are ethylenically unsaturated sulfonic acids and/or ethylenically unsaturated phosphonic acids or salts thereof or anhydrides thereof, preferably vinylsulfonic acid, vinylphosphonic acid and/or 2-acrylamido-2-methylpropanesulfonic acid. The proportion of these comonomers in the total amount of monomers used in step i) is up to 5% by weight, preferably up to 3% by weight.

Further optional comonomers used with preference in step i) are esters of α,β-unsaturated monocarboxylic acids and/or monoesters or preferably diesters of α,β-unsaturated dicarboxylic acids with primary, secondary and/or tertiary saturated monohydric alcohols having from 1 to 20 carbon atoms. These may, for example, be the methyl, ethyl, propyl, butyl or the 2-ethylhexyl esters of acrylic acid, of methacrylic acid and/or itaconic acid, or the corresponding monoesters or especially diesters of maleic acid, fumaric acid or citraconic acid, and also the esters of the mono- and/or dicarboxylic acids mentioned with cycloaliphatic or polycyclic alcohols and of fatty alcohols. The proportion of these comonomers in the total amount of monomers used in step i) is up to 25% by weight, preferably up to 15% by weight.

Further optional comonomers used with preference in step i) are epoxy-functional, ethylenically unsaturated compounds, such as glycidyl methacrylate, glycidyl acrylate and/or vinylepoxycyclohexane. The proportion of these comonomers in the total amount of monomers used in step i) is up to 10% by weight, preferably up to 5% by weight.

Further optional comonomers used with preference in step i) are silicone-functional, ethylenically unsaturated compounds such as acryloyloxyalkyltri(alkoxy)silanes and methacryloyloxyalkyltri(alkoxy)silanes, vinyltrialkoxysilanes and/or vinylalkyldialkoxysilanes. The proportion of these comonomers in the total amount of monomers used in step i) is up to 10% by weight, preferably up to 5% by weight.

In a preferred variant of the inventive multistage polyvinyl ester dispersions, as well as the vinyl ester of saturated carboxylic acids, at least one ethylenically unsaturated comonomer containing silane groups and/or at least one ethylenically unsaturated epoxide compound is used.

Further optional comonomers used with preference in step i) are polyethylenically unsaturated and hence crosslinking comonomers, for example diallyl phthalate, diallyl maleate, triallyl cyanurate, tetraallyloxyethane, divinylbenzene, butanediol 1,4-dimethacrylate, triethylene glycol dimethacrylate, divinyl adipate, allyl(meth)acrylate, vinyl crotonate, methylenebisacrylamide, hexanediol diacrylate, pentaerythritol diacrylate and trimethylolpropane triacrylate, or mixtures of two or more compounds from this group. The proportion of these comonomers in the total amount of monomers used in step i) is up to 10% by weight, preferably up to 2% by weight.

Further optional comonomers used with preference in step i) are hydroxy-functional esters of unsaturated carboxylic acids, such as hydroxyethyl(meth)acrylate, hydroxypropyl (meth)acrylate and adducts thereof with ethylene oxide or propylene oxide. The proportion of these comonomers in the total amount of monomers used in step i) is up to 25% by weight, preferably up to 15% by weight.

Further optional comonomers used with preference in step i) are ethylenically unsaturated compounds containing crosslinkable groups, such as carbonyl groups or N-methylol groups. Examples thereof are diacetoneacrylamide, allyl acetoacetate, vinyl acetoacetate, acetoacetoxyethyl(meth) acrylate, N-ethanol(meth)acrylamide, N-propanol(meth) acrylamide, (meth)acrylamide, allyl carbamate, acrylonitrile, the N-methylol esters, N-methylol alkyl ethers or Mannich bases of N-methylol(meth)-acrylamide or N-methylolallyl carbamate, acrylamidoglycolic acid and/or salts thereof, methyl acrylamidomethoxyacetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth) acrylamide, N-benzyl(meth)acrylamide, p-hydroxyphenyl (meth)acrylamide, N-(3-hydroxy-2,2-dimethylpropyl) methacrylamide, ethylimidazolidone methacrylate or N-vinylformamide, N-vinylpyrrolidone. The proportion of these comonomers in the total amount of monomers used in step i) is up to 10% by weight, preferably up to 5% by weight.

The proportion of other comonomers used in addition to the vinyl esters in step i) may be up to 60% by weight in total.

In step ii) of the process according to the invention, the abovementioned monomers can be used. In the monomers used in step ii) in the individual case, at least one of the monomers used in step ii) differs from the monomers used in step i).

In principle, it is possible to use any combinations of the abovementioned monomers in steps i) and ii) of the process according to the invention, although at least one vinyl ester of a saturated carboxylic acid is used in step i) and the total amount of monomers having acid groups and/or having anhydride groups used must not exceed 6% by weight, based on the total amount of monomers.

The monomer classes usable in step ii) are thus generally vinyl esters of straight-chain and/or branched aliphatic carboxylic acids having from one to eighteen carbon atoms, vinyl esters of aromatic carboxylic acids, ethylenically unsaturated aliphatic or cycloaliphatic hydrocarbons, vinylaromatics, especially styrene, α-methylstyrene, vinyltoluene and/or vinyl xylene, halogenated unsaturated aliphatic hydrocarbons, α,β-unsaturated mono- and/or dicarboxylic acids, ethylenically unsaturated sulfonic acids and/or phosphonic acids or salts thereof, esters of α,β-unsaturated monocarboxylic acids with primary, secondary and/or tertiary saturated monohydric alcohols having from 1 to 20 carbon atoms, monoesters or preferably diesters of α,β-unsaturated dicarboxylic acids with primary, secondary and/or tertiary saturated monohydric alcohols having from 1 to 20 carbon atoms, epoxy-functional ethylenically unsaturated compounds, silicone-functional ethylenically unsaturated compounds, polyethylenically unsaturated and hence crosslinking comonomers, hydroxy-functional esters of unsaturated carboxylic acids, and crosslinkable or self-crosslinking ethylenically unsaturated comonomers.

The weight ratios of the monomers used in steps i) and ii) of the process according to the invention can be varied within wide ranges, for example from 10:90 to 90:10, preferably from 80:20 to 20:80 and more preferably from 60:40 to 40:60. The quantitative ratios to be selected in the individual case depend on the nature of the individual monomers and on the properties desired in the individual case and can be selected in a manner known per se by the person skilled in the art.

In the preparation of the inventive dispersions, preference is given to using different vinyl esters of saturated carboxylic acids in steps i) and ii); very particular preference is given to using, in step i), a combination of at least one vinyl ester of saturated carboxylic acids with at least one α-olefin, especially with ethylene.

In a further preferred variant of the process according to the invention, monomers which can be copolymerized only poorly with vinyl esters of saturated carboxylic acids are used in step ii). These include especially vinylaromatics and/or esters of mono- or dicarboxylic acids, very particularly styrene, acrylates and/or methacrylates.

It has been found that, surprisingly, these monomers which are copolymerizable poorly or almost not at all with vinyl esters of saturated carboxylic acids can be incorporated into the polymer dispersion in large amounts by the process according to the invention. However, it is not possible as yet to explain exactly the manner in which this incorporation proceeds. It appears to be influenced by the monomer combination used in steps i) and ii). In some systems, particles of grafted copolymers appear to form; in other systems, in contrast, polymodal particle size distributions have been observed and indications that different particles with different chemical structure form have been found. What is common to all of these dispersions is that their films, compared to the dispersions of the same monomer combinations prepared in one step, have improved tensile strength and exhibit a greater contact angle with respect to water, and only a very small amount of coagulum forms.

Particular preference is given to polyvinyl ester dispersions obtained in a multistage process for which, in stage i), monomers of types A1, A2 and optionally A4 and/or optionally A5 and/or optionally A6; or monomers of types A1, A3 and optionally A4 and/or optionally A5 and/or optionally A6; or monomers of types A1, A2, A3 and optionally A4 and/or optionally A5 and/or optionally A6 are used, and for which, in stage ii), monomers of types A3 and/or A7 are used.

The type A1 monomers are vinyl esters of straight-chain or branched aliphatic saturated carboxylic acids of chain length $C_1$-$C_4$, for example vinyl formate, vinyl acetate, vinyl propionate, vinyl butyrate or vinyl isobutyrate. Vinyl acetate is preferred. The vinyl esters A1 may also be present in the polyvinyl ester dispersion in combination of two or more thereof alongside one another.

The proportion of monomers A1, optionally in combination with further comonomers from this group, is from 40 to 100% by weight, preferably from 70 to 90% by weight, based on the total amount of monomers used in step i).

The type A2 monomers are branched or straight-chain α-olefins having from 2 to 8 carbon atoms, for example prop-1-ene, but-1-ene, pent-1-ene, hex-1-ene, hept-1-ene, oct-1-ene and especially ethylene.

The proportion of monomers A2, optionally in combination with further comonomers from this group, is from 0 to 45% by weight, preferably from 5 to 45% by weight, more preferably from 8 to 25% by weight, most preferably from 10 to 20% by weight, based on the total amount of monomers used in step i).

The type A3 monomers are vinyl esters of straight-chain or branched aliphatic saturated carboxylic acids of chain length $C_5$-$C_{18}$, for example vinyl esters of α-branched carboxylic acids having from 5 to 11 carbon atoms in the acid radical (®Versatic acids), the vinyl esters of pivalic acid, 2-ethylhexanoic acid, lauric acid, palmitic acid, myristic acid and stearic acid. Vinyl esters of Versatic acids, especially VeoVa® 9, VeoVa® 10 and VeoVa® 11, are preferred. The vinyl esters A3 may also be present in the polyvinyl ester dispersion in combination of two or more thereof alongside one another.

The proportion of the monomers A3, optionally in combination with further comonomers from this group, is from 0 to 60% by weight, preferably from 2 to 40% by weight, more preferably from 4 to 30% by weight, most preferably from 5 to 25% by weight, based on the total amount of monomers used in step i).

The type A4 monomers are ethylenically unsaturated monomers containing silane groups, for example monomers of the general formula $RSi(CH_3)_{0-2}(OR^1)_{3-1}$, where R is defined as $CH_2=CR^2-(CH_2)_{0-1}$ or $CH_2=CR^2CO_2-(CH_2)_{1-3}$, $R^1$ is an unbranched or branched, optionally substituted alkyl radical which has from 1 to 12 carbon atoms and may optionally be interrupted by an ether group, and $R^2$ is H or $CH_3$. Instead of or in addition to these monomers, the type A4 monomers used may also be ethylenically unsaturated epoxide compounds, such as glycidyl methacrylate or glycidyl acrylate. Preference is given to using combinations of ethylenically unsaturated monomers containing silane groups and ethylenically unsaturated epoxide compounds.

The preferred type A4 ethylenically unsaturated monomers containing silane groups are silanes of the formula $CH_2=CR^2-(CH_2)_{0-1}Si(CH_3)_{0-1}(OR^1)_{3-2}$ and $CH_2=CR^2CO_2-(CH_2)_3Si(CH_3)_{0-1}(OR^1)_{3-2}$, where $R^1$ is a branched or unbranched alkyl radical having from 1 to 8 carbon atoms and $R^2$ is H or $CH_3$.

Particularly preferred type A4 silanes are vinylmethyldimethoxysilane, vinyl methyldiethoxysilane, vinylmethyldi-n-propoxysilane, vinylmethyldiiso-propoxysilane, vinylmethyldi-n-butoxysilane, vinylmethyldi-sec-butoxysilane, vinylmethyldi-tert-butoxysilane, vinylmethyldi-(2-methoxyisopropyloxy)silane and vinylmethyldioctyloxysilane.

Further examples of preferred silanes are γ-(meth)acryloyloxypropyltris(2-methoxyethoxy)silane, γ-(meth)acryloyloxypropyltrismethoxysilane, γ-(meth)acryloxypropyltrisethoxysilane, γ-(meth)acryloyloxypropyltris-n-propoxysilane, γ-(meth) acryloyloxypropyltrisisopropoxysilane, γ-(meth) acryloyloxypropyltrisbutoxysilane, γ-acryloyloxypropyltris(2-methoxyethoxy)silane, γ-acryloyloxypropyltrismethoxysilane, γ-acryloyloxypropyltrisethoxysilane, γ-acryloyloxypropyltris-n-propoxysilane, γ-acryloyloxypropyltrisisopropoxysilane, γ-acryloyloxypropyltrisbutoxysilane, and also vinyltris(2-methoxyethoxy)silane, vinyltrismethoxysilane, vinyltrisethoxysilane, vinyltris-n-propoxysilane, vinyltrisisopropoxysilane and vinyltrisbutoxysilane. The silane compounds mentioned can optionally also be used in the form of their (partial) hydrolysates.

The proportion of monomers A4, optionally in combination with further comonomers from this group, is from 0 to 10% by weight, preferably from 0.5 to 5% by weight, based on the total amount of monomers used in step i).

The type A5 monomers are ethylenically unsaturated compounds which have at least one stabilizing nonionic or ionic group, preferably an acid group, in the molecule, which additionally stabilize the emulsion polymer by means of polymer-bound functional groups and/or charges.

Suitable comonomers A5 with stabilizing nonionic groups are especially esters of ethylenically unsaturated aliphatic mono- and/or dicarboxylic acids with polyalkylene glycols, preferably with polyethylene glycols and/or polypropylene glycols, or esters of ethylenically unsaturated carboxylic acids with amino alcohols, such as (meth)acrylic esters of amino alcohols, for example of diethylaminoethanol, and/or (meth)acrylic esters with dimethylaminoethanol, and (meth) acrylic esters with dihydric aliphatic alcohols of chain length $C_2$-$C_{18}$, in which only one alcohol group is esterified. Additionally suitable are amides of ethylenically unsaturated carboxylic acids such as amides of acrylic acid and methacrylic acid, and N-methylolamides of acrylic acid and methacrylic acid, and ethers thereof. A further group of these monomers is that of N-vinylamides including the N-vinyllactams, for example vinylpyrrolidone or N-vinyl-N-methylacetamide.

Suitable comonomers A5 with stabilizing ionic groups are ethylenically unsaturated carboxylic acids or sulfonic acids which have one or two carboxyl groups or a sulfonic acid group. Instead of the free acids, it is also possible to use their salts, preferably alkali metal or ammonium salts.

Examples thereof are acrylic acid, methacrylic acid, crotonic acid, maleic acid, fumaric acid, itaconic acid, vinylsulfonic acid, styrenesulfonic acid, monoesters of maleic acid, of fumaric acid and/or of itaconic acid with monohydric aliphatic saturated alcohols of chain length $C_1$-$C_{18}$, and their alkali metal and ammonium salts, or (meth)acrylic esters of sulfoalkanols, for example sodium 2-sulfoethylmethacrylate.

Particularly preferred type A5 comonomers are acrylic acid, methacrylic acid, crotonic acid, itaconic and/or vinylsulfonic acid.

The amount of any further comonomers A5 present, if appropriate in combination with further comonomers from this monomer group, is up to 5% by weight, preferably up to 3% by weight, based on the total amount of monomers used in step i).

The type A6 monomers are any further ethylenically unsaturated compounds which do not belong to the type A1 to A5 monomers and are readily or less readily copolymerizable with the type A1 to A5 monomers. Examples of type A6 monomers are esters of saturated aliphatic monocarboxylic acids with monohydric unsaturated alcohols of chain length $C_3$-$C_{18}$, esters of ethylenically unsaturated mono- or dicarboxylic acids, especially of acrylic acid and/or methacrylic acid, with monohydric aliphatic saturated alcohols; halogenated olefins such as vinyl chloride, vinylidene chloride and/or tetrafluoroethylene; ethylenically unsaturated nitriles such as acrylonitrile and/or methacrylonitrile; polyethylenically unsaturated, optionally halogenated hydrocarbons, such as butadiene, 2-chlorobutadiene, 2,3-dichlorobutadiene and/or isoprene; $C_9$-$C_{16}$ alpha-olefins; vinylaromatics such as styrene; vinyl ethers of monohydric aliphatic saturated alcohols of chain length $C_1$-$C_{18}$; divinyl and/or diallyl esters of saturated and unsaturated aliphatic dicarboxylic acids of chain length $C_3$-$C_{18}$; vinyl and allyl esters of acrylic acid and crotonic acid; and triallyl cyanurate.

The amount of any further comonomers A6 present, optionally in combination with further comonomers from this monomer group, is typically up to 10% by weight, preferably up to 8% by weight, based on all of the monomers present in step i).

The type A7 monomers are a subgroup of the type A6 monomers which can be used in step ii) of the process according to the invention. Type A7 monomers can be copolymerized with vinyl esters of saturated carboxylic acids only with difficulty. The type A7 monomers include esters of ethylenically unsaturated monocarboxylic acids with monohydric aliphatic saturated alcohols, diesters of ethylenically unsaturated dicarboxylic acids with monohydric aliphatic saturated alcohols and/or vinylaromatics.

The type A7 monomers are used in step ii) of the process according to the invention preferably alone or in the form of mixtures of monomers of this group, optionally in combination with type A4 and/or A5 monomers.

In a further preferred variant of the process according to the invention, the type A3 monomers are used in step ii) alone or in the form of mixtures of monomers of this group, optionally in combination with type A4 and/or A5 monomers.

Particular preference is given to polyvinyl ester dispersions comprising a polymer which is obtained by multistage copolymerization and has structural units which derive from vinyl esters of $C_5$-$C_{18}$ carboxylic acids, acrylates, methacrylates, acrylamides, methacrylamides, bisesters of maleic acid with $C_1$-$C_{18}$ alcohols, bisesters of fumaric acid with $C_1$-$C_{18}$ alcohols and/or vinylaromatics, more preferably from vinyl esters of $C_5$-$C_{18}$ carboxylic acids, esters of acrylic acid and/or of methacrylic acid with $C_1$-$C_{18}$ alcohols, styrene and/or α-methylstyrene.

Particular preference is likewise given to polyvinyl ester dispersions comprising a polymer which is obtained by multistage copolymerization and has structural units which derive from vinyl esters of straight-chain or branched $C_1$-$C_{18}$ carboxylic acids, preferably from vinyl acetate and optionally from further vinyl esters of branched and saturated $C_5$-$C_{12}$ carboxylic acids and/or from α-olefins, most preferably from vinyl acetate and ethylene.

Very particular preference is given to polyvinyl ester dispersions comprising one or more polymers which are obtained by multistage copolymerization and have structural units which derive from vinyl acetate and ethylene, and also structural units derived from acrylate and/or methacrylate and/or vinyl esters of a branched and saturated $C_5$-$C_{12}$ carboxylic acid.

Very particular preference is likewise given to polyvinyl ester dispersions comprising one or more polymers which are obtained by multistage copolymerization and have structural units which derive from at least one vinyl ester of a branched and saturated $C_1$-$C_{18}$ carboxylic acid, and from at least one vinylaromatic.

Very particular preference is likewise given to polyvinyl ester dispersions comprising one or more polymers which are obtained by multistage copolymerization and have structural units which derive from at least one monomer selected from the group of the monomers containing ethylenically unsaturated silane groups, the monomers containing ethylenically unsaturated epoxide groups, the monomers containing ethylenically unsaturated carboxylic acid, sulfonic acid, phosphoric acid or phosphonic acid groups or salts thereof, or the mixtures of at least two of these monomers.

The inventive polyvinyl ester dispersions comprise at least one protective colloid and/or comprise at least one emulsifier. Preferably only protective colloid, or protective colloid and up to 3.65% by weight of emulsifier, are present.

Suitable protective colloids, i.e. polymeric stabilizers, are methylcelluloses, hydroxyethyl- and propylcelluloses, and also sodium carboxymethylcellulose, gelatin, casein, starch, gum arabic, hydroxyethyl starch and sodium alginate.

The preferred protective colloid is polyvinyl alcohol. Suitable polyvinyl alcohol has degrees of hydrolysis of from 60 to 100 mol % and viscosities of the 4% aqueous solutions at 20° C. of 2-70 mPa*s, especially from 30 to 70 mPa*s.

The protective colloids mentioned can of course also be used in the form of mixtures.

When protective colloids are used, the amount thereof, based on the total amount of monomers used, is typically from 0.1 to 15 parts by weight, preferably from 0.3 to 5 parts by weight.

In a preferred variant, the inventive polyvinyl ester dispersions contain no protective colloid at all, or the amount of protective colloid, based on the total amount of monomers used, is less than 1% by weight, more preferably less than 0.7% by weight.

The emulsifiers used are generally nonionic emulsifiers or combinations of nonionic with ionic emulsifiers.

Examples of nonionic emulsifiers are acyl, alkyl, oleyl and alkylaryl ethoxylates. These products are, for example, commercially available under the name Genapol® or Lutensol®. They include, for example, ethoxylated mono-, di- and trialkylphenols (EO: from 3 to 50, alkyl substituted radical: $C_4$ to $C_{12}$) and ethoxylated fatty alcohols (EO: from 3 to 80; alkyl radical: $C_8$ to $C_{36}$), especially $C_{12}$-$C_{14}$-fatty alcohol (3-8) ethoxylates, $C_{13}C_{15}$-oxo alcohol (3-30) ethoxylates, $C_{16}C_{18}$-fatty alcohol (11-80) ethoxylates, $C_{10}$-oxo alcohol (3-11) ethoxylates, $C_{13}$-oxo alcohol (3-20) ethoxylates, polyoxyethylene sorbitan monooleate with 20 ethylene oxide groups, copolymers of ethylene oxide and propylene oxide with a minimum content of 10% by weight of ethylene oxide, the polyethylene oxide (4-20) ethers of oleyl alcohol and the polyethylene oxide (4-20) ethers of nonylphenol. Particularly suitable are the polyethylene oxide (4-20) ethers of fatty alcohols, especially of oleyl alcohol.

When nonionic emulsifiers are used, the amount thereof, based on the total amount of monomers used, is typically from 0.05 to 10 parts by weight, preferably from 0.05 to 5.0 parts by weight, more preferably from 0.05 to 3.65 parts by weight and most preferably from 0.1 to 1 part by weight. It is also possible to use mixtures of nonionic emulsifiers.

Instead of or in addition to nonionic emulsifiers, it is possible to use ionic emulsifiers, preferably anionic emulsifiers. Examples include sodium, potassium and ammonium salts of straight-chain aliphatic carboxylic acids of chain length $C_{12}$-$C_{20}$, sodium hydroxyoctadecanesulfonate, sodium, potassium and ammonium salts of hydroxy fatty acids of chain length $C_{12}$-$C_{20}$ and their sulfation and/or acetylation products thereof, alkyl sulfates, also in the form of triethanolamine salts, alkyl-($C_{10}$-$C_{20}$)-sulfonates, alkyl-($C_{10}$-$C_{20}$)-arylsulfonates, dimethyldialkyl-($C_8$-$C_{18}$)-ammonium chloride, and sulfation products thereof, alkali metal salts of sulfosuccinic esters with aliphatic saturated monohydric alcohols of chain length $C_4$-$C_{16}$, sulfosuccinic 4-esters with polyethylene glycol ethers of monohydric aliphatic alcohols of chain length $C_{10}$-$C_{12}$ (disodium salt), sulfosuccinic 4-esters with polyethylene glycol nonylphenyl ether (disodium salt), sulfosuccinic acid biscyclohexyl ester (sodium salt), lignosulfonic acid and the calcium, magnesium, sodium and ammonium salts thereof, resin acids, hydrogenated and dehydrogenated resin acids and alkali metal salts thereof, sodium (dodecylated diphenyl ether) disulfonate and sodium laurylsulfate, or ethoxylated sodium lauryl ether sulfate (3 EO). It is also possible to use mixtures of ionic emulsifiers.

When ionic emulsifiers are used, the amount thereof, based on the total amount of monomers used, is typically from 0.05 to 10 parts by weight, preferably from 0.05 to 5.0 parts by weight, more preferably from 0.05 to 3.65 parts by weight and most preferably from 0.1 to 1 part by weight. It is also possible to use mixtures of ionic emulsifiers.

When emulsifiers are used, the total amount thereof, based on the total amount of the monomers used, is typically from 0.05 to 10 parts by weight, preferably from 0.05 to 5.0 parts by weight, more preferably from 0.05 to 3.65 parts by weight and most preferably from 0.1 to 1 part by weight.

The inventive aqueous polyvinyl ester dispersions typically have solids contents of from 20 to 70% by weight, preferably from 30 to 65% by weight and more preferably from 40 to 60% by weight.

The pH of the inventive dispersion is typically between 2 and 7, preferably between 2.5 and 6.

The inventive polyvinyl ester dispersions can be prepared by the above-described process according to the invention.

This is a free-radical emulsion polymerization which has been modified by a selected step ii).

The free-radical emulsion polymerization in step i) can be carried out in a manner known per se in a batchwise process, in a feed process, in a combined batchwise/feed process or in a continuous process.

In step i), preference is given to working in a combined batchwise/feed process and particular preference to working in a feed process, in which case an amount of the monomers used in step i), for example from 1 to 15% by weight, is typically initially charged to start the polymerization. The monomers can be metered in either together or in separate feeds. In addition, it may be advantageous in particular embodiments to establish specific particle sizes and particle size distributions at the start of step i) by performing a seed polymerization.

The emulsifier and/or the protective colloid also used for stabilization can be initially charged completely at the start of step i), or can be initially charged in part and metered in part, or can be metered in completely during the performance of step i).

The polymerization temperature during step i) varies typically within the range from 20 to 120° C., preferably within the range from 30 to 110° C. and most preferably within the range from 45 to 95° C.

To start the polymerization, the initiators of free-radical polymerization known per se can be used. Examples thereof are hydrogen peroxide, benzoyl peroxide, cyclohexanone peroxide, isopropylcumyl hydroperoxide, persulfates of potassium, sodium and ammonium, peroxides of even-numbered saturated monobasic aliphatic carboxylic acids of chain length $C_8$-$C_{12}$, tert-butyl hydroperoxide, di-tert-butyl peroxide, diisopropyl percarbonate, azoisobutyro nitrile, acetylcyclohexanesulfonyl peroxide, tert-butyl perbenzoate, tert-butyl peroctoate, bis(3,5,5-trimethyl)hexanoyl peroxide, tert-butyl perpivalate, hydroperoxypinane, p-menthane hydroperoxide. The aforementioned compounds can also be used within a redox system, in which case it is also possible to use transition metal salts such as iron(II) salts, or other reducing agents. The reducing agents or regulators used may also be alkali metal salts of oxymethanesulfinic acid, mercaptans of chain length $C_{10}$-$C_{14}$, buten-(l)-ol-(3), hydroxylamine salts, sodium dialkyldithiocarbamate, sodium bisulfite, ammonium bisulfite, sodium dithionite, diisopropylxanthogen disulfide, ascorbic acid, tartaric acid, isoascorbic acid, boric acid, urea and formic acid.

However, preference is given to using water-soluble persulfates, especially ammonium persulfate or sodium persulfate, to initiate the polymerization.

The initiator for the polymerization used in step i) can be added completely to the reaction mixture at the start of step i) or can be added in part or metered in part in the course of step i) or can be metered in completely during the performance of step i).

After the complete or virtually complete conversion of at least 90%, preferably at least 95%, of the monomers used in step i), step ii) is commenced.

To this end, the entire amount of the monomers provided for the next stage of the polymerization process is added in pure form or in the form of a solution to the polymerization mixture obtained in step i). In this step too, the monomers can be metered in either together or in separate feeds. The duration for the addition varies typically within the range from 5 to 60 minutes, preferably from 15 to 30 minutes.

The temperature of the reaction mixture during step ii) may vary within the range of the temperature at the end of step i); the temperature during step ii) is preferably lowered by up to 40° C. compared to the temperature at the end of step i).

The monomers are added to the reaction mixture in step ii) in pure form or in the form of solutions in organic solvents. Preference is given to adding the monomers to the reaction mixture in liquid and pure form.

After the addition of the monomers in step ii), step iii) is commenced by adding the initiator. This can be done immediately after step ii) has ended or after a rest phase of, for example, from 15 to 120 minutes. It is assumed that the monomers supplied in step ii) can be distributed in or on the polymer particles formed in the first stage during the performance of step ii) and within any rest phase which follows.

To restart the polymerization in step iii) of the process according to the invention, the initiators of free-radical polymerization known per se can be used. Examples thereof are listed above in the description of step i).

In this case too, the initiator for the polymerization used in step iii) can be added completely to the reaction mixture at the start of step iii) or can be added in part and metered in part in the course of step iii) or can be metered in completely during the performance of step iii).

The polymerization temperature during step iii) varies typically within the range from 20 to 120° C., preferably within the range from 30 to 110° C. and most preferably within the range from 45 to 95° C.

Before starting the second stage of the polymerization, it is advisable to increase the temperature of the reaction mixture before or during the addition of the initiator.

On completion of step iii), for demonomerization, a further, preferably chemical aftertreatment, especially with redox catalysts, for example combinations of the abovementioned oxidizing agents and reducing agents, may follow. In addition, residual monomer present can be removed in a known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm).

The inventive aqueous polyvinyl ester dispersions can be used as binders for coating compositions of all kinds, including adhesives. Particular preference is given to using these polyvinyl ester dispersions as sole binders.

The proportion of polymer dispersion in the coating composition is typically from 5 to 50% by weight, preferably from 10 to 50% by weight, more preferably from 15 to 30% by weight, based on the total solids content.

The inventive polyvinyl ester dispersions are used, for example, as binders in formulations which serve for coating of substrates. These include, for example, synthetic resin-bound plasters, paste-form tile adhesives, paste-form sealants and paste-form sealing compositions, preferably for porous components, and papercoating slips, but especially paints, for example emulsion paints, other emulsion coatings and glazes.

The above-described coating compositions comprise the binder generally as the sole binder. This means that these coating compositions comprise only small amounts, if any, of hydraulically setting materials.

The invention also relates to these uses.

The inventive polyvinyl ester dispersion can also be used to produce redispersible dispersion powders. These can be obtained in a manner known per se by spraying the polyvinyl ester dispersion.

The examples which follow serve to illustrate the invention. The parts and percentages reported in the examples are based on the weight, unless stated otherwise.

COMPARATIVE EXAMPLE 1

Preparation of a Dispersion of a Vinyl Acetate-Ethylene Copolymer by Conventional Copolymerization A pressure apparatus with stirrer, jacket heater and metering pumps was charged with an aqueous solution consisting of the following constituents:

21 525 g of water, 86 g of sodium acetate, 1440 g of a 70% by weight aqueous solution of an oxoalkyl ethoxylate with 28 mol of ethylene oxide, 2167 g of a 10% by weight aqueous polyvinyl alcohol solution (viscosity of the 4% by weight aqueous solution 23 mPa*s), 1127 g of a 15% by weight sodium laurylsulfate solution, 577 g of a 30% by weight aqueous sodium vinylsulfonate solution and 8 g of 1% by weight aqueous solution of $Fe(II)((SO_4) \times 7H_2O$. The pH of the solution was 7.2. The apparatus was freed of atmospheric oxygen and ethylene was injected into the apparatus up to ethylene pressure 20 bar. 1640 g of vinyl acetate were then metered in. The apparatus was heated to internal temperature 60° C. At 35° C., 10% of a solution of 30 g of Brüggolit C in 2215 g of water were metered in. Subsequently, 10% of a solution of 42.8 g of 70% by weight aqueous t-butyl hydroperoxide in 2215 g of water were metered in, in the course of which the internal temperature rose to 60° C. and the heat of reaction was removed by cooling. A mixture of 31 065 g of vinyl acetate and 72 g of vinyltrimethoxysilane (VTM) was metered in, in the course of which the ethylene pressure was kept at 40 bar until 1725 g of ethylene were in the reactor. At the same time, the remaining 90% of the reduction and initiator solution were metered in at internal temperature 60° C.

Thereafter, a solution of 36 g of sodium peroxodisulfate in 600 g of water was metered in and the internal temperature was increased to 80° C. and kept at this temperature for 1 hour.

COMPARATIVE EXAMPLE 2

Preparation of a Dispersion of a Vinyl Acetate-Ethylene Copolymer Modified with 2-Ethylhexyl Acrylate by Conventional Copolymerization A pressure apparatus with stirrer, jacket heater and metering pumps was charged with an aqueous solution consisting of the following constituents:

21 525 g of water, 86 g of sodium acetate, 1440 g of a 70% by weight aqueous solution of an oxoalkyl ethoxylate with 28 mol of ethylene oxide, 2167 g of a 10% by weight aqueous polyvinyl alcohol solution (viscosity of the 4% by weight aqueous solution 23 mPa*s), 1127 g of a 15% by weight sodium laurylsulfate solution, 577 g of a 30% by weight aqueous sodium vinylsulfonate solution and 8 g of 1% by weight aqueous solution of $Fe(II)((SO_4) \times 7H_2O$. The pH of the solution was 7.2. The apparatus was freed of atmospheric oxygen and ethylene was injected into the apparatus up to ethylene pressure 20 bar. 5% of the mixture of 28 440 g of vinyl acetate, 4500 g of 2-ethyl hexyl acrylate and 63 g of vinyltrimethoxysilane (VTM) was metered in. The apparatus was heated to internal temperature 60° C. At 35° C., 10% of a solution of 30 g of Brüggolit C in 2215 g of water were metered in. Subsequently, 10% of a solution of 42.8 g of 70% by weight aqueous t-butyl hydroperoxide in 2215 g of water were metered in, in the course of which the internal temperature rose to 60° C. and the heat of reaction was removed by cooling. The remaining 95% of the monomer mixture were metered in, in the course of which the ethylene pressure was kept at 40 bar until 1500 g of ethylene were in the reactor. At the same time, the remaining 90% of the reduction and initiator solution were metered in at internal temperature 60° C.

Thereafter, a solution of 36 g of sodium peroxodisulfate in 600 g of water was metered in and the internal temperature was increased to 80° C. and kept at this temperature for 1 hour.

COMPARATIVE EXAMPLE 3

Preparation of a Dispersion of a Vinyl Acetate-Ethylene Copolymer Modified with VeoVa® 10 by Conventional Copolymerization Process as comparative example 2, except with monomer mixture composed of 29 250 g of vinyl acetate, 3450 g of VeoVa® 10 and 72 g of vinyltrimethoxysilane (VTM), and addition of 1725 g of ethylene.

EXAMPLE 1

Preparation of a Dispersion of a Vinyl Acetate-Ethylene Copolymer Modified with 2-Ethylhexyl Acrylate by Inclusion Polymerization A pressure apparatus with stirrer, jacket heater and metering pumps was charged with an aqueous solution consisting of the following constituents:

22 700 g of water, 74 g of sodium acetate, 1240 g of a 70% by weight aqueous solution of an oxoalkyl ethoxylate with 28 mol of ethylene oxide, 1860 g of a 10% by weight aqueous polyvinyl alcohol solution (viscosity of the 4% by weight aqueous solution 23 mPa*s), 970 g of a 15% by weight sodium laurylsulfate solution, 500 g of a 30% by weight aqueous sodium vinylsulfonate solution and 7 g of a 1% by weight aqueous solution of $Fe(II)((SO_4) \times 7H_2O$. The pH of the solution was 7.2. The apparatus was freed of atmospheric oxygen and ethylene was injected into the apparatus up to ethylene pressure 20 bar. 1390 g of vinyl acetate were then metered in. The apparatus was heated to internal temperature 60° C. At 35° C., 10% of a solution of 26 g of Brüggolit C in 1900 g of water was metered in. Subsequently, 10% of a solution of 37 g of 70% by weight aqueous t-butyl hydroperoxide in 1900 g of water was metered in, in the course of which the internal temperature rose to 60° C. and the heat of reaction was removed by cooling. A mixture of 26 740 g of vinyl acetate and 62 g of vinyltrimethoxysilane (VTM) was metered in, in the course of which the ethylene pressure was kept at 40 bar until 1483 g of ethylene were in the reactor. At the same time, the remaining 90% of the reduction and initiator solution were metered in at internal temperature 60° C.

Thereafter, the internal temperature was increased to 80° C. and kept at this temperature for 1 hour. Subsequently, the mixture was cooled to 50° C., 4450 g of 2-ethylhexyl acrylate were metered in and the internal temperature was kept at 50° C. for a further hour. The mixture was now heated to internal temperature 85° C. and a solution of 14.8 g of sodium peroxodisulfate in 590 g of water was metered in. The internal temperature was kept at 85° C. for a further hour and then cooled.

EXAMPLE 2

Preparation of a Dispersion of a Vinylacetate-Ethylene Copolymer Modified with VeoVa® 10 by Inclusion Polymerization A pressure apparatus with stirrer, jacket heater and metering pumps was charged with an aqueous solution consisting of the following constituents:

23 000 g of water, 78 g of sodium acetate, 1300 g of a 70% by weight aqueous solution of an oxoalkyl ethoxylate with 28 mol of ethylene oxide, 1950 g of a 10% by weight aqueous polyvinyl alcohol solution (viscosity of the 4% by weight aqueous solution 23 mPa*s), 1010 g of a 15% by weight sodium laurylsulfate solution, 520 g of a 30% by weight aqueous sodium vinylsulfonate solution and 7 g of a 1% by weight aqueous solution of $Fe(II)((SO_4) \times 7H_2O$. The pH of the solution was 7.2. The apparatus was freed of atmospheric oxygen and ethylene was injected into the apparatus up to ethylene pressure 20 bar. 1450 g of vinyl acetate were then metered in. The apparatus was heated to internal temperature 60° C. At 35° C., 10% of a solution of 27 g of Brüggolit C in 2000 g of water was metered in. Subsequently, 10% of a solution of 39 g of 70% by weight aqueous t-butyl hydroperoxide in 2000 g of water was metered in, in the course of which the internal temperature rose to 60° C. and the heat of reaction was removed by cooling. A mixture of 27 910 g of vinyl acetate and 65 g of vinyltrimethoxysilane (VTM) was metered in, in the course of which the ethylene pressure was kept at 40 bar until 1550 g of ethylene were in the reactor. At the same time, the remaining 90% of the reduction and initiator solution were metered in at internal temperature 60° C.

Thereafter, the internal temperature was increased to 80° C. and kept at this temperature for 1 hour. Subsequently, the mixture was cooled to 50° C., 3100 g of Veova 10 were metered in and the internal temperature was kept at 50° C. for a further hour. The mixture was now heated to internal temperature 85° C. and a solution of 15.5 g of sodium peroxodisulfate in 620 g of water was metered in. The internal temperature was kept at 85° C. for a further hour and then cooled.

EXAMPLE 3

Preparation of a Dispersion of a Vinyl Acetate-Ethylene Copolymer Modified with Methyl Methacrylate by Inclusion Polymerization The procedure was as in example 1, except that the 2-ethylhexyl acrylate was replaced by 4450 g of methyl methacrylate.

The table which follows describes some characteristic data of the dispersions prepared and of the films produced therewith.

| Example | Solids (%) | MFT (° C.) | $T_g$-I (° C.) | Aerosol $d_w$ (nm) | Screen residue (%) | Contact angle of dispersion film (°) | Contact angle of color film (°) |
|---------|------------|------------|----------------|---------------------|---------------------|--------------------------------------|----------------------------------|
| CE1     | 54.2       | 11         | 29.0           | 173                 | 0.0008              | 33                                   | 42                               |
| CE2     | 54.1       | 3          | 19.5           | 165                 | 0.0085              | 39                                   | 62                               |
| CE3     | 54.1       | 7          | 23.0           | 180                 | 0.0012              | 47                                   | 63                               |
| 1       | 52.8       | 6          | 29.6           | 214                 | 0.0034              | 80                                   | 88                               |
| 2       | 53.8       | 6          | 28.2           | 187                 | 0.0029              | 55                                   | 94                               |
| 3       | 53.5       | 12         | 32.2           | 192                 | 0.0022              | 40                                   | n.d.                             |

COMPARATIVE EXAMPLE 4

Preparation of a Dispersion of a Vinyl Acetate-Ethylene Copolymer by Conventional Copolymerization without Use of Protective Colloid A pressure apparatus with stirrer, jacket heater and metering pumps was charged with an aqueous solution consisting of the following constituents:

24 000 g of water, 86 g of sodium acetate, 1465 g of a 70% by weight aqueous solution of an oxoalkyl ethoxylate with 28 mol of ethylene oxide, 400 g of 85% by weight sodium salt of a sulfosuccinic ester, 572 g of a 30% by weight aqueous sodium vinylsulfonate solution and 8 g of a 1% by weight aqueous solution of Fe(II)(($SO_4$)×$7H_2O$. The pH of the solution was 7.2. The apparatus was freed of atmospheric oxygen and ethylene was injected into the apparatus up to ethylene pressure 20 bar. 1620 g of vinyl acetate were then metered in. The apparatus was heated to internal temperature 60° C. At 35° C., 10% of a solution of 30 g of Brüggolit C in 2215 g of water was metered in. Subsequently, 10% of a solution of 42.8 g of 70% by weight aqueous t-butyl hydroperoxide in 2215 g of water was metered in, in the course of which the internal temperature rose to 60° C. and the heat of reaction was removed by cooling. A mixture of 30 770 g of vinyl acetate and 72 g of vinyltrimethoxysilane (VTM) was metered in, in the course of which the ethylene pressure was kept at 40 bar until 1710 g of ethylene were in the reactor. At the same time, the remaining 90% of the reduction and initiator solution were metered in at internal temperature 60° C.

Thereafter, a solution of 36 g of sodium persulfate in 600 g of water was metered in and the internal temperature was increased to 80° C. and kept at this temperature for 1 hour.

COMPARATIVE EXAMPLE 5

Preparation of a Dispersion of a Vinyl Acetate-Ethylene Copolymer Modified with Methyl Methacrylate by Conventional Copolymerization without Use of Protective Colloid A pressure apparatus with stirrer, jacket heater and metering pumps was charged with an aqueous solution consisting of the following constituents:

24 000 g of water, 86 g of sodium acetate, 1465 g of a 70% by weight aqueous solution of an oxoalkyl ethoxylate with 28 mol of ethylene oxide, 400 g of 85% by weight sodium salt of a sulfosuccinic ester, 572 g of a 30% by weight aqueous sodium vinylsulfonate solution and 8 g of a 1% by weight aqueous solution of Fe(II)(($SO_4$)×$7H_2O$. The pH of the solution was 7.2. The apparatus was freed of atmospheric oxygen and ethylene was injected into the apparatus up to ethylene pressure 20 bar. 5% of the mixture of 29 450 g of vinyl acetate, 3110 g of methyl methacrylate and 65 g of vinyltrimethoxysilane (VTM) was then metered in. The apparatus was heated to internal temperature 60° C. At 35° C., 10% of a solution of 30 g of Brüggolit C in 2215 g of water was metered in. Subsequently, 10% of a solution of 42.8 g of 70% by weight aqueous t-butyl hydroperoxide in 2215 g of water was metered in, in the course of which the internal temperature rose to 60° C. and the heat of reaction was removed by cooling. The remaining 95% of the monomer mixture was metered in, in the course of which the ethylene pressure was kept at 40 bar until 1550 g of ethylene were in the reactor. At the same time, the remaining 90% of the reduction and initiator solution were metered in at internal temperature 60° C.

Thereafter, a solution of 36 g of sodium peroxodisulfate in 600 g of water was metered in and the internal temperature was increased to 80° C. and kept at this temperature for 1 hour.

COMPARATIVE EXAMPLE 6

Preparation of a Dispersion of a Vinyl Acetate-Ethylene Copolymer Modified with Butyl Acrylate by Conventional Copolymerization without Use of Protective Colloid The procedure was as in comparative example 5, except that a monomer mixture of 28 170 g of vinyl acetate, 4460 g of butyl acrylate and 62 g of vinyltrimethoxysilane (VTM) was used, and 1487 g of ethylene were added.

EXAMPLE 4

Preparation of a Dispersion of a Vinyl Acetate-Ethylene Copolymer Modified with Methyl Methacrylate by Inclusion Polymerization without Use of Protective Colloid A pressure apparatus with stirrer, jacket heater and metering pumps was charged with an aqueous solution consisting of the following constituents:

25 300 g of water, 76 g of sodium acetate, 1313 g of a 70% by weight aqueous solution of an oxoalkyl ethoxylate with 28 mol of ethylene oxide, 360 g of an 85% by weight sodium salt of a sulfosuccinic ester, 513 g of a 30% by weight aqueous sodium vinylsulfonate solution and 7 g of a 1% by weight aqueous solution of $Fe(II)((SO_4) \times 7H_2O$. The pH of the solution was 7.2. The apparatus was freed of atmospheric oxygen and ethylene was injected into the apparatus up to ethylene pressure 20 bar. 1437 g of vinyl acetate were then metered in. The mixture was heated to internal temperature 60° C. At 35° C., 10% of a solution of 26.5 g of Brüggolit C in 1960 g of water was metered in. Subsequently, 10% of a solution of 37.6 g of 70% by weight aqueous t-butyl hydroperoxide in 1960 g of water was metered in, in the course of which the internal temperature rose to 60° C. and the heat of reaction was removed by cooling. A mixture of 27 610 g of vinyl acetate and 64 g of vinyltrimethoxysilane (VTM) was metered in, in the course of which the ethylene pressure was kept at 40 bar until 1532 g of ethylene were in the reactor. At the same time, the remaining 90% of the reduction and initiator solution was metered in at internal temperature 60° C.

Thereafter, the internal temperature was heated to 80° C. and the mixture was kept at this temperature for 1 hour. Subsequently, the mixture was cooled to 50° C., 3065 g of methyl methacrylate were metered in and the internal temperature was kept at 50° C. for a further hour. The mixture was now heated to internal temperature 85° C. and a solution of 15.3 g of sodium peroxodisulfate in 610 g of water was metered in. The internal temperature was kept at 85° C. for a further hour and then cooled.

EXAMPLE 5

Preparation of a Dispersion of a Vinyl Acetate-Ethylene Copolymer Modified with Butyl Acrylate by Inclusion Polymerization without Use of Protective Colloid A pressure apparatus with stirrer, jacket heater and metering pumps was charged with an aqueous solution consisting of the following constituents:

25 500 g of water, 74 g of sodium acetate, 1260 g of a 70% by weight aqueous solution of an oxoalkyl ethoxylate with 28 mol of ethylene oxide, 345 g of an 85% by weight sodium salt of a sulfosuccinic ester, 490 g of a 30% by weight aqueous sodium vinylsulfonate solution and 7 g of a 1% by weight aqueous solution of $Fe(II)((SO_4) \times 7H_2O$. The pH of the solution was 7.2. The apparatus was freed of atmospheric oxygen and ethylene was injected into the apparatus up to ethylene pressure 20 bar. 1380 g of vinyl acetate were then metered in. The mixture was heated to internal temperature 60° C. At 35° C., 10% of a solution of 26 g of Brüggolit C in 1900 g of water was metered in. Subsequently, 10% of a solution of 37 g of 70% by weight aqueous t-butyl hydroperoxide in 1900 g of water was metered in, in the course of which the internal temperature rose to 60° C. and the heat of reaction was removed by cooling. A mixture of 26 440 g of vinyl acetate and 62 g of vinyltrimethoxysilane (VTM) was metered in, in the course of which the ethylene pressure was kept at 40 bar until 1467 g of ethylene were in the reactor. At the same time, the remaining 90% of the reduction and initiator solution was metered in at internal temperature 60° C.

Thereafter, the internal temperature was heated to 80° C. and the mixture was kept at this temperature for 1 hour. Subsequently, the mixture was cooled to 50° C., 4402 g of butyl acrylate were metered in and the internal temperature was kept at 50° C. for a further hour. The mixture was now heated to internal temperature 85° C. and a solution of 14.7 g of sodium peroxodisulfate in 590 g of water was metered in. The internal temperature was kept at 85° C. for a further hour and then cooled.

EXAMPLE 6

Preparation of a Dispersion of a Vinyl Acetate-Ethylene Copolymer Modified with Lauryl Acrylate by Inclusion Polymerization without Use of Protective Colloid The procedure was as described in example 5; instead of the butyl acrylate, 4402 g of lauryl acrylate were used.

COMPARATIVE EXAMPLE 7

Preparation of a Dispersion of a Vinyl Acetate-Ethylene Copolymer Modified with Lauryl Acrylate by Polymerization According to U.S. Pat. No. 4,616,057

The monomers and emulsifiers as described in example 6 were used. The polymerization was effected in an analogy to example 1 of U.S. Pat. No. 4,616,057.

EXAMPLE 7

Preparation of a Dispersion of a Vinyl Acetate-Ethylene Copolymer Modified with 2-Ethylhexyl Acrylate by Inclusion Polymerization without Use of Protective Colloid The procedure was as described in example 5; instead of butyl acrylate, 4402 g of 2-ethylhexyl acrylate were used.

EXAMPLE 8

Preparation of a Dispersion of a Vinyl Acetate-Ethylene Copolymer Modified with VeoVa® 10 by Inclusion Polymerization without Use of Protective Colloid The procedure was as described in example 5; instead of butyl acrylate, 4402 g of Veova® 10 were used.

The table which follows describes some characteristic data of the dispersions prepared and of the films produced therewith.

| Example | Solids (%) | MFT (°C.) | $T_g$-I (°C.) | $T_g$-II (°C.) | Aerosol $d_w$ (nm) | Screen residue (%) | Contact angle of dispersion film (°) | Contact angle of color film (°) |
|---|---|---|---|---|---|---|---|---|
| CE4 | 54.1 | 9 | 29.0 | — | 152 | 0.0008 | <5 | 20 |
| CE5 | 54.1 | 16 | 33.6 | — | 148 | 0.0027 | <5 | 30 |
| CE6 | 54.0 | 4 | 16.6 | — | 144 | 0.0006 | <5 | 45 |
| CE7 | 52.7 | — | 13.3 | — | 213 | 2.1453 | — | — |
| 4 | 53.4 | 11 | 28.8 | — | 168 | 0.0029 | <5 | 36 |
| 5 | 53.2 | 7 | 48.7 | 27.2 | 177 | 0.0018 | 64 | 75 |
| 6 | 50.8 | 7 | −0.2 | 29.9 | 177 | 0.0011 | 84 | — |
| 7 | 53 | 7 | 30.1 | — | 170 | 0.0028 | 87 | — |
| 8 | 53.3 | 6 | 27.5 | — | 174 | 0.0072 | 71 | — |

Film Formation Properties and Mechanical Properties of the Films Obtained.

The above-described dispersions were used to produce films of thickness 0.65 mm. To this end, the dispersion in question was applied with a 1000 μm knife coater to a glass plate coated with Teflon®. The water was evaporated at room temperature by leaving it to stand and the film formed was pulled off. The results are shown in the table below.

TABLE

Film formation properties and properties of the films.

| Dispersion from example | Elongation at break[1] (%) | Tensile strength[1] (N/mm$^2$) | Contact angle[2] (°) | Minimum film formation temperature[3] (° C.) |
|---|---|---|---|---|
| C4 | 334 | 10.7 | 20 | 9 |
| C5 | 196 | 13.4 | 30 | 16 |
| 4 | 234 | 16.7 | 36 | 11 |
| C6 | 640 | 5.5 | 45 | 4 |
| 5 | 638 | 11.1 | 75 | 7 |

[1] determined to DIN 53455; elongation rate: 100 mm/min
[2] determined by the following method: the dispersion or paint was knife-coated onto a microscope slide and dried at room temperature for one day. A water droplet was applied to the polymer film by means of a syringe as close as possible to the edge of the microscope slide. The contact angle was measured directly by applying the tangent to the droplet profile at the three-phase point (solid/liquid/gaseous) by means of a goniometer microscope.
[3] The minimum film formation temperature ("MFT") is that limiting temperature above which an aqueous polymer dispersion forms a crack-free film in the course of drying under fixed conditions. The MFT was determined with a film formation bench with a cryostat (from Coesfeld, Dortmund). The film drawing ruler was used to establish a layer thickness of 0.3 mm.

The invention claimed is:

1. A polyvinyl ester dispersion containing a copolymer produced by a multistage free-radical emulsion polymerization of at least one vinyl ester of a straight-chain or branched aliphatic saturated carboxylic acid having a carbon chain length of from $C_1$ to $C_{18}$ and optionally further monomers copolymerizable therewith in a first stage and of at least one different free-radically polymerizable monomer in a second stage in the presence of a protective colloid, an emulsifier, or mixtures thereof, wherein the at least one different free-radically polymerizable monomer is selected from the group consisting of a vinyl aromatic and an ester of an ethylenically unsaturated mono- or dicarboxylic acid with the proviso that the at least one different free-radically polymerizable monomer does not include a vinyl ester of a saturated carboxylic acid, wherein the tensile strength of the films obtained from the polyvinyl ester dispersion prepared in the multistage polymerization is at least 10% greater than the tensile strength of films which have been produced from polyvinyl ester dispersions of the same monomer composition which have been prepared in a one-stage process, the polyvinyl ester dispersion prepared in the multistage polymerization has a screen residue based on the polyvinyl ester dispersion, measured with a 40 μm screen, of less than 0.05% by weight, and the content in the copolymer obtained from the polyvinyl ester dispersion prepared in the multistage polymerization of polymerized acids, acid anhydrides, or mixtures thereof does not exceed 6% by weight, based on the total amount of monomers and wherein the content of protective colloid, based on the total monomer content, is less than 0.7% by weight, and wherein the dispersion does not include hydraulically setting materials.

2. The polyvinyl ester dispersion as claimed in claim 1, wherein the tensile strength of the films obtained from the polyvinyl ester dispersion prepared in the multistage polymerization is at least 20% greater than the tensile strength of films which have been obtained from polyvinyl ester dispersions of the same monomer composition which have been prepared in a one-stage process.

3. The polyvinyl ester dispersion as claimed in claim 1, wherein the polyvinyl ester dispersion prepared in the multistage polymerization has a screen residue based on the polyvinyl ester dispersion, measured with a 40 μm screen, of less than 0.02% by weight.

4. The polyvinyl ester dispersion as claimed in claim 1, wherein the contact angle between water and the films obtained from the polyvinyl ester dispersion is at least 10% greater than the contact angle between water and films which have been obtained from polyvinyl ester dispersions of the same monomer composition prepared in a one-stage process.

5. The polyvinyl ester dispersion as claimed in claim 1, wherein the content in the copolymer of polymerized acids, acid anhydrides, or mixtures thereof does not exceed 3% by weight, based on the total amount of monomers.

6. The polyvinyl ester dispersion as claimed in claim 1, which has a content of emulsifier of up to 5.0% by weight, based on the total weight of monomers used.

7. The polyvinyl ester dispersion as claimed in claim 1, which comprises up to 3.65% by weight of emulsifier.

8. The polyvinyl ester dispersion as claimed in claim 1, wherein the copolymer contains structural units which are derived from vinyl acetate and optionally from further vinyl esters of branched and saturated $C_5$-$C_{12}$-carboxylic acids, from α-olefins, or mixtures thereof.

9. The polyvinyl ester dispersion as claimed in claim 1, wherein the copolymer has structural units which are derived from an acrylate, a methacrylate, a vinyl ester of a branched and saturated $C_5$-$C_{12}$-carboxylic acid, or mixtures thereof.

10. The polyvinyl ester dispersion as claimed in claim 1, wherein the copolymer further contains structural units which are derived from at least one monomer selected from the group consisting of monomers containing ethylenically unsaturated silane groups, monomers containing ethylenically unsaturated epoxide groups, monomers containing ethylenically unsaturated carboxylic acid, sulfonic acid, phosphoric acid or phosphonic acid groups, and salts thereof.

11. A substrate coated with the polyvinyl ester dispersion of claim 1.

12. A redispersible dispersion powder produced from the polyvinyl ester dispersion of claim 1.

13. A process for preparing a polyvinyl ester dispersion comprising the steps of
   i) polymerizing a mixture of at least one vinyl ester of a straight-chain or branched aliphatic saturated carboxylic acid having a carbon chain length of from $C_1$ to $C_{18}$ and optionally further monomers copolymerizable therewith in the presence of at least one emulsifier, at least one protective colloid, or mixtures thereof up to a conversion of at least 90% of the monomers used,
   ii) adding at least one free-radically polymerizable monomer other than the vinyl ester used in step i) in pure form or in the form of a solution to the mixture obtained in step i), wherein the free-radically polymerizable monomer is selected from the group consisting of a vinyl aromatic and an ester of an ethylenically unsaturated mono- or dicarboxylic acid with the proviso that the free-radically polymerizable monomer does not include a vinyl ester of a saturated carboxylic acid, and
   iii) adding at least one free-radical polymerization initiator in step iii) after the addition of the monomer(s) in step ii) has ended, such that the monomer(s) added in step ii) are polymerized in the presence of the mixture obtained in step i), with the proviso that the content of monomers with acid groups, with acid anhydride groups, or with mixtures thereof does not exceed 6% by weight, based on the total amount of monomers and wherein the content of the protective colloid, based on the total monomer content, is less than 0.7% by weight, and wherein the dispersion does not include hydraulically setting materials.

14. The process as claimed in claim 13, wherein vinyl acetate is used in step i) in combination with further vinyl esters of branched and saturated $C_5$-$C_{12}$-carboxylic acids, with α-olefins, or with mixtures thereof.

15. The process as claimed in claim 14, wherein at least one acrylate, methacrylate, or mixtures thereof is used in step ii).

16. The process as claimed in claim 13, wherein polymerization in step i) is carried out at temperatures between 60 and 120° C., the temperature of the mixture before the addition of the monomer(s) in step ii) is lowered to below 60° C., and, between the end of the addition of the monomer(s) in step ii) and addition of the polymerization initiator in step iii), the temperature is kept at less than 60° C.

17. The process as claimed in claim 16, wherein the temperature of the mixture at the start of step iii) is increased to from 60 to 120° C.

* * * * *